United States Patent [19]

Saller, deceased et al.

[11] Patent Number: 4,709,848

[45] Date of Patent: Dec. 1, 1987

[54] METHOD OF BONDING

[75] Inventors: Henry A. Saller, deceased, late of Columbus, by Marjorie Saller, executrix; Edwin S. Hodge; Stanley J. Paprocki; Russell W. Dayton, all of Columbus, Ohio

[73] Assignee: The United States of America as represented by the United States Department of Energy, Washington, D.C.

[21] Appl. No.: 687,842

[22] Filed: Oct. 2, 1957

[51] Int. Cl.$^4$ .............................................. B23K 20/14
[52] U.S. Cl. .................................. 228/159; 228/190; 228/193; 228/243; 228/263.21
[58] Field of Search ..................... 29/471.5, 494, 497.5, 29/194, 473.5, 472.1, 471.1, 472.9, 473.1, 503, 470.9, 470, 423, 424; 228/159, 190, 193, 243, 263.21

[56] References Cited

U.S. PATENT DOCUMENTS

| | | |
|---|---|---|
| 1,040,606 | 10/1912 | Auth . |
| 2,096,924 | 10/1937 | Schwarzkopf . |
| 2,160,558 | 5/1939 | Orr . |
| 2,451,442 | 10/1948 | Meissner . |
| 2,478,037 | 5/1949 | Brennan . |
| 2,619,438 | 11/1952 | Varian et al. . |
| 2,713,196 | 7/1955 | Brown . |
| 2,758,368 | 8/1956 | Ulam . |
| 2,776,472 | 1/1957 | Mesick . |
| 2,807,082 | 9/1957 | Zambrow et al. . |
| 2,820,286 | 1/1958 | Andrus . |
| 2,820,751 | 1/1958 | Saller . |
| 2,857,657 | 10/1958 | Wheeler . |
| 2,938,846 | 5/1960 | Hix et al. . |
| 2,947,678 | 8/1960 | Gimera et al. . |

FOREIGN PATENT DOCUMENTS

777236 6/1957 United Kingdom .

OTHER PUBLICATIONS

Metal Progress, vol. 59, Issue 5, May 1951, pp. 664–667.

*Primary Examiner*—John F. Terapane
*Assistant Examiner*—Mary Lou Mallon
*Attorney, Agent, or Firm*—James W. Weinberger; Arthur A. Churm; Judson R. Hightower

EXEMPLARY CLAIM

1. A method of making a fuel-containing structure for nuclear reactors, comprising providing an assembly comprising a plurality of fuel units; each fuel unit consisting of a core plate containing thermal-neutron-fissionable material, sheets of cladding metal on its bottom and top surfaces, said cladding sheets being of greater width and length than said core plates whereby recesses are formed at the ends and sides of said core plate, and end pieces and first side pieces of cladding metal of the same thickness as the core plate positioned in said recesses, the assembly further comprising a plurality of second side pieces of cladding metal engaging the cladding sheets so as to space the fuel units from one another, and a plurality of filler plates of an acid-dissolvable nonresilient material whose melting point is above 2000° F., each filler plate being arranged between a pair of said second side pieces and the cladding plates of two adjacent fuel units, the filler plates having the same thickness as the second side pieces; the method further comprising enclosing the entire assembly in an envelope; evacuating the interior of the entire assembly through said envelope; applying inert gas under a pressure of about 10,000 psi to the outside of said envelope while at the same time heating the assembly to a temperature above the flow point of the cladding metal but below the melting point of any material of the assembly, whereby the envelope is pressed against the assembly and integral bonds are formed between plates, sheets, first side pieces, and end pieces and between the sheets and the second side pieces; slowly cooling the assembly to room temperature; removing the envelope; and dissolving the filler plates without attacking the cladding metal.

4 Claims, 4 Drawing Figures

METHOD OF BONDING

The invention deals with the bonding of materials to each other and in particular with affecting the bonding under hydrostatic pressure.

Pressure bonding usually is done by die rolling, drawing or coextrusion. However, there are instances where these conventional methods are not advisable. For instance, for elements of intricate shapes or round cross sections the above-listed methods are not particularly suitable because of the distortion affected thereby. Also, where very precise dimensions are required these methods are not satisfactory because it is difficult to adjust rolling, drawing or coextrusion so that the exact amount of reduction is accomplished. This makes it necessary to machine the elements to the precise dimensions after the pressure bonding has been accomplished. Intricate shapes and precise dimensions, for instance, are important in the case of fuel elements and control elements for neutronic reactors where dimensions have to be very accurate and the tolerance is usually less than one thousandth of an inch.

In using conventional methods for bonding materials it is required that the plasticity characteristics of the metals being bonded are adequately matched because of the substantial displacement of the materials. Also, in the case of roll bonding core materials having flat plate shapes the finished products have feathered edges on the cores the exact locations of which are difficult to detect because of the surrounding cladding.

The conventional methods of pressure bonding are also unsuitable when one of the metals is highly corrosive when subjected to elevated temperatures in the presence of air. To prevent excessive oxidation of the corrosive metals in the mechanical pressure-bonding processes, it is necessary to enclose the elements in an airtight evacuated jacket formed of a noncorrosive material prior to heating for the bonding operation. These materials are especially useful in the fabrication of fuel elements for neutronic reactors.

It is an object of this invention to provide a process for bonding materials which is applicable to elements of all shapes and in particular of shapes that cannot be bonded by conventional-forming methods.

It is another object of this invention to provide a process of cladding a core in which the plasticity characteristics of the materials need not be matched.

It is another object of this invention to provide a process of bonding materials by which very little deformation is obtained.

It is another object of this invention to provide a process of bonding materials by which a cladding is obtained that is free from flaws so that an inspection of the completed elements can be dispensed with.

It is a further object of this invention to provide a process for bonding elements whereby an article of predetermined size is obtained so that no machining after the bonding is necessary.

Another object of this invention is to provide a process of binding a cladding to a core whereby the bonded article contained has a cladding layer of uniform thickness.

A further object of this invention is to provide a process for bonding a cladding to a core having square corners whereby the square corners are not feathered but remain square and properly positioned.

It is still another object of this invention to provide a process for bonding materials wherein at least one of the materials is highly reactive to gases other than noble at elevated temperatures.

Other objects and advantages of this invention will be readily recognized upon further study of the specification in conjunction with the appending drawings in which.

The above objects are accomplished by assembling the members or pieces to be bonded, evacuating the spaces between the members, surrounding the assemblies by an inert gas under superatmospheric pressure, subjecting the assembly in the inert gas for a period of time at a sufficient temperature to cause a plastic flow of at least one of the materials but not at a greater temperature than the melting point of one of the materials and cooling the bonded material to room temperature, whereby an integral bond is obtained and the dimensions of the assembly formed of the pieces are substantially maintained.

The process of this invention is useful in forming an integral bond between most metals, however, it is particularly useful in forming bonds where at least one of the materials used is readily reactive when subjected to other than noble gases at high temperature. The process is most advantageously used with metals such as zirconium, hafnium, vanadium, tantalum, titanium, molybdenum, niobium and uranium, and associated alloys, where oxide contamination of the surfaces of the metal are problematical. Other metals such as stainless steel, nickel, and aluminum may also be used in the processes of this invention, as well as ceramic materials such as uranium oxide and metal hydrides since it is not necessary to match plasticity characteristics.

In preparing the material to be bonded for the process of the invention, it is advisable to machine or form them to precise dimensions prior to assembling. The clearance between the various elements should not be more than one or two mils. If metals are being used the elements are advantageously pickled with an acid followed by washing and drying, preferably immediately before assembling. This is particularly important in the case of highly reactive metals such as previously listed. After these steps, the pieces are assembled immediately, enclosed in a heatable pressure vessel and sealed therein. The autoclave must be able to withstand high pressures and is preferably made of steel. It has a lid which hermetically seals the vessel with the exception that it has an inlet valve for the inert gas. Helium and argon have been found suitable for the inert atmosphere, and other gases may be used if they are inert with the materials used and have a suitable heat conductivity. The temperature and time requirements are somewhat dependent on the type of materials to be bonded.

The best results are obtained if the member to be coated or clad is of a material that has a slightly higher coefficient of expansion when heated than the cladding material; by this the material to be protected or core exerts the pressure against the cladding which improves the bonding. In this case, it is also advantageous to carry out the cooling steps slowly so that the pressure of the gas and of the core material against the cladding material is maintained for a longer period of time.

Figure 1:
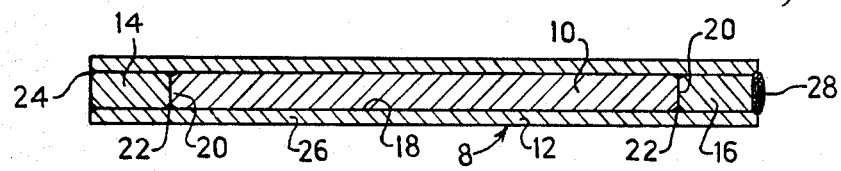
FIG. 1 is a longitudinal sectional view of one type of neutronic reactor fuel element which is shown assembled prior to being bonded by the process of this invention.

As was previously stated, the process of the invention is particularly useful in cladding fuel elements for neutronic reactors, and the following is an example of such a fuel element. A neutronic reactor fuel element 8 consisting of a zirconium-22 w/o uranium core 10 clad with a thin layer of zirconium such as shown in FIG. 1 of the drawings was successfully fabricated by the following method. The zirconium-22 w/o uranium core 10 was a rod shaped member measuring approximately 27" long and 0.140" in diameter. The cladding was formed of a zirconium tube 12, ten mils thick on the radius and two end plugs 14 and 16 measuring $\frac{3}{8}$" long at each end of the rod-like core 10. The zirconium-uranium core 10 was fabricated to the above dimensions as well as a zirconium tubing 12 measuring $\frac{3}{8}$" longer on each end. The tubing 12 was fitted around the core with a total clearance of not more than four mils. Zirconium end plugs 14 and 16 having approximately the same radius as the zirconium-uranium core 10 were used for closing the ends of the tube enclosing the core therein.

The inside surface 18 of the zirconium tubing 12 was cleaned and prepared by first degreasing with acetone and brushing with a stainless-steel wire brush. The surface was pickled by pumping an aqueous solution of 5% hydrofluoric acid (concentrated) and 45% nitric acid (all percents by volume) through the tube 12 at a rate of 20 cubic feet per minute for four minutes while the tube 12 was contained in a constant temperature water bath at 80° F. The tube 12 then was rinsed in water and acetone. The zirconium end plugs 14 and 16 were degassed in a vacuum furnace at 1650° F. for two hours and then acid-pickled in a manner similar to the zirconium tubing 12.

The zirconium-uranium core 10 was prepared by first vapor blasting with No. 325 grit and water-flushed to remove loose material. The remaining oxide was removed by placing the core 10 in rotary motion and polishing with 2 and 3/0-grit emery paper. The mechanical cleaning was followed by chemical cleaning in an acid pickling solution of 5% hydrofluordic acid, 50% nitric acid, and 45% water, the pickling time varying from one to three minutes depending on the condition of the mechanically cleaned core 10. Alternate water and acetone rinses were used to remove any acid residue. The ends 20 of the core material were polished with 3/0-grit emergy paper prior to attaching the end plugs as hereinafter described.

The fuel element 8 was assembled by first flash welding the end plugs 14 and 16 to the ends of the zirconium-uranium core, as shown by the reference numeral 22 in FIG. 1. The excess metal at the welds 22 was removed by a centerless grinding operation after which the flash weld area was subjected to an acid pickling treatment in 45% nitric acid, 50% water, and 5% hydrofluoric acid solution for 30 seconds with the end plugs masked off because of their faster dissolving rate. Alternate rinses with water and acetone removed any residual acid solution. The core-end plug assemblies were then inserted into the zirconium tubing 12 and the first end closure 24 between the end plug 14 and the tubing 12 were made by arc welding to form a sheath 26 of zirconium containing the rod shaped core. The resulting assembly was evacuated at the open end and the second end closure 28 was affected with an induction heater. The fuel element 8 was then ready for bonding.

The assembled fuel element 8 was inserted in a thick walled stainless steel autoclave and heated to temperature while introducing helium under pressure to the vessel. The assemblies were subjected to 2,000 to 2,325 pounds per square inch at temperatures from 1550° to 1650° F. Uniform diffusion bonds from 1$\frac{1}{2}$ to 2$\frac{1}{2}$ mils deep with good strength characteristics were achieved in 24 hours at 1550° F. under a static pressure of 2325 pounds per square inch. Significant improvements in the bond strength and quality were noted when the time factor was increased to 36 hours. The time was considerably reduced to from 2 to 8 hours, however, when the pressure was increased to about 10,000 psi. The assembly was allowed to slowly cool at room temperature in order to maintain maximum pressures at the bonding surface throughout.

The best results are obtained when the temperature and pressure is maintained at the highest practical level. By so doing the time required for integral diffusion bonds to be formed is substantially reduced. It is to be noted, however, that the temperature may be varied between the plastic flow point of the cladding material and the melting point of any material present, while the pressure may be varied over a substantial range with a corresponding inversely proportional range of time duration for the process. It has been found that when the core is uranium or a uranium based material and the cladding is zirconium or a zirconium based material the temperature may range between 1500°–2000° F. while the pressure is variable between 2000–20,000 psi and the time between 1 to 40 hours. Other examples will be presently given where materials of the stated classes are used and which are subjected to the process of the invention within the operating ranges disclosed.

Figure 2:
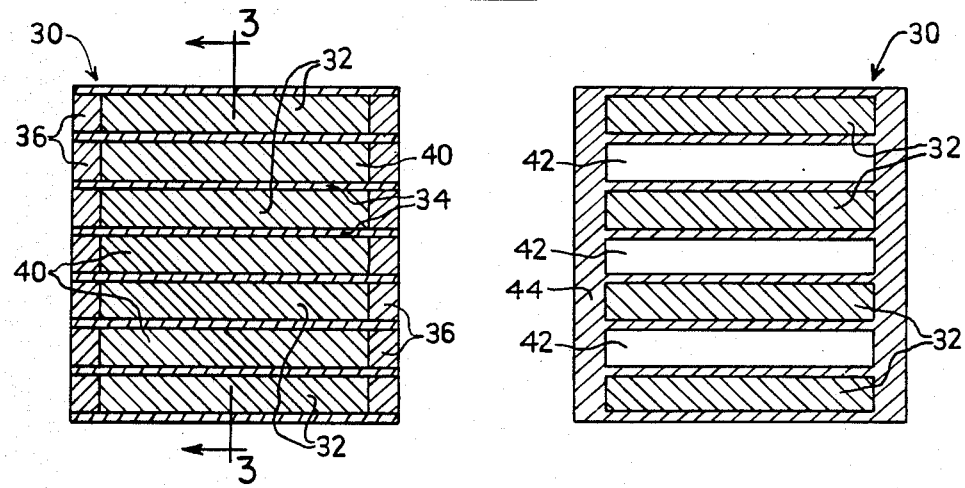
FIG. 2 is a transverse sectional view of another type of fuel element which is shown assembled prior to being bonded by the process of this invention.
Figure 4:
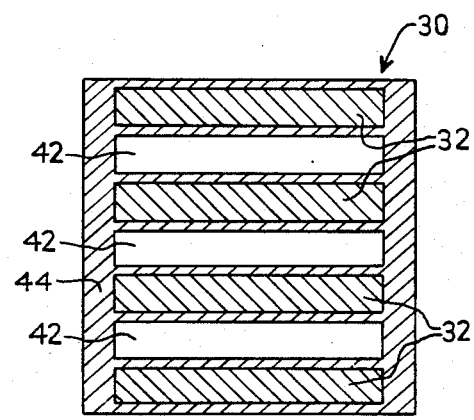
FIG. 4 is a transverse sectional view of the same fuel element as FIG. 2 showing the assembly after bonding has been effected by the process of this invention.
Figure 3:
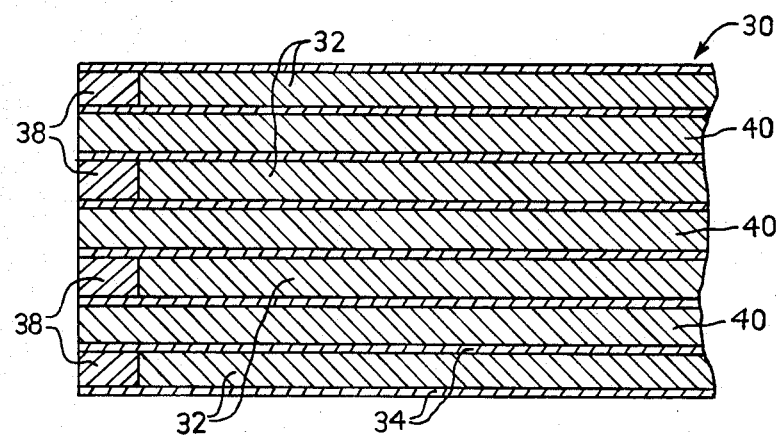
FIG. 3 is a longitudinal sectional view in part taken along the line 3—3 of the fuel element shown in FIG. 2.

Another example showing the use of the process in cladding a core having a particularly intricate shape will now be given with respect to neutronic reactor flat fuel plate assemblies comprised of a plurality of fuel elements. FIGS. 2 through 4 of the appended drawings depict a fuel assembly 30 in which all of the plate type cores 32 are clad by the processes of this invention after being assembled. The assembly 30 comprises a plurality of long flat sheets 34 of the cladding material in a stacked arrangement, spaced apart by side pieces 36 of the same material along the longer edges of the sheets 34. The plate like cores 32 fit into alternate spaces formed by the cladding material so that a core 32 is immediately adjacent each of the outermost sheets 34. End pieces 38 close the spaces housing the cores 32 at the shorter edges of the sheets 34. In the remaining alternate spaces are filler plates 40 which extend to the extreme ends of the assembly and are of a material which may be readily removed by chemical means without harming the cladding material.

The applicants have successfully clad fuel elements of the type just described where the plate like cores 32 were fabricated of a uranium-zirconium alloy of the same content as the fuel element cores in the aforementioned co-application of Rice et al., the sheets 34, side pieces 36, and end pieces 38 which form the cladding being fabricated of the same zirconium alloy material used for the fuel element jackets described therein. The filler plates 40 were made of steel which could be later removed from the assembly by etching with nitric-acid without harming the zirconium alloy cladding.

The separate pieces were first machined to the required sizes with a maximum of four mils clearance between the cores 32 and the zirconium alloy pieces 34, 36 and 38 forming the cladding. The zirconium-uranium alloy cores 32 and the zirconium alloy pieces were separately cleaned and prepared by the same procedures outlined above for the rod like fuel elements 8. The steel filler plates 40 were prepared by degassing in acetone and washing. The parts were assembled to form the assembly shown in FIGS. 2 and 3 which was then encased in a closely conforming mild steel envelope (not shown) having an opening through which the interior was evacuated prior to sealing. The sealed envelope containing the assembly was placed in an autoclave into which helium was pumped to a pressure of 10,000 psi while the temperature was maintained at between 1550° to 1575° F. The pressure and temperature were maintained at this level for between 2 and 6 hours after which time the assembly was removed from the autoclave and allowed to cool to room temperature. The mild steel envelope was then peeled off and the assembly was immersed in a nitric acid bath which etched away the steel filler plates and also served to clean the zirconium alloy surfaces. When the steel filler plates were removed, channels 42, FIG. 3, were provided for the passage of coolant when the assembly is placed in an operating neutronic reactor. The zirconium alloy pieces bond to each other and to the plate like cores 32 to provide an integral cladding 44 therearound. Uniform bonds of good strength have been obtained with displacement of materials being less than 3 mils which may be readily compensated for in the initial machining.

Zirconium has been clad to nonalloyed uranium cores by cleaning and assembling the elements in a manner similar to that discussed above and subjecting the assembly to a pressure of 10,000 psi at a temperature of 1550° F. for a period of 2 to 8 hours. Zirconium was also applied to a nickel-plated uranium core, the nickel serving as a barrier, by subjecting the assembly to 10,000 psi pressure at a 1250° to 1350° F. for a period of 2 to 8 hours. It was found that the nickel plating on the core diffused separately with the uranium and with the zirconium to effect the integral bond. It was necessary to maintain the lower temperatures in this case to prevent any formation of eutectics of the nickel with the uranium or zirconium, the eutectics being too porous and brittle to effect strong bonds.

The applicant has also been successful in applying the process of this invention to clad ceramic core materials such as $UO_2$ and $ThO_2$ with pure metals such as Zr, Al and the like and metal alloys such as stainless steel, and uranium-zirconium and uranium-aluminum alloys. This is possible because under the process of this invention the plasticity properties of the materials used do not necessarily have to be matched as in ordinary cladding processes. Rectangular pellets of $UO_2$ measuring approximately 2×2×0.040 inches have been clad with zirconium by first cleaning the pellets and carefully brushing on a graphite coating to prevent interaction between the $UO_2$ and the zirconium, surrounding the pellet in a multi-part zirconium envelope and evacuating and sealing the assembly. Subjecting the assembly to an inert gas atmosphere of about 10,000 psi for 2 to 6 hrs. while maintaining a temperature in the range of 1500° to 1600° F. has caused the zirconium to form an integral bond around the pellet with an interface between the pellet and the cladding which has excellent heat conductivity characteristics. Since the bonding takes place between the zirconium parts the operating ranges cited for the first example are also applicable here.

Metal hydrides such as zirconium hydride, titanium hydride, lanthanum hydride and rare earth hydrides in the form of pellets have also been clad in stainless steel by subjecting the cleaned assembly to an inert gas pressure of 10,000 psi for approximately 4 hrs. at 1650° F. to get a close contact between the pellets and the cladding, followed by an hour treatment at 1950° F. to get a bonding. In preparing the hydride pellets they are not sintered but merely consolidated. To obtain the best results a thin layer of molybdenum may be placed between the hydride and the stainless steel to act as a hydrogen barrier therebetween.

It is the intent of the applicants not to be limited by the details of the process as outlined in the foregoing specification, but to be awarded protection for the full breadth of their invention as outlined by the appended claims.

What is claimed is:

1. A method of making a fuel-containing structure for nuclear reactors, comprising providing an assembly comprising a plurality of fuel units; each fuel unit consisting of a core plate containing thermal-neutron-fissionable material, sheets of cladding metal on its bottom and top surfaces, said cladding sheets being of greater width and length than said core plates whereby recesses are formed at the ends and sides of said core plate, and end pieces and first side pieces of cladding metal of the same thickness as the core plate positioned in said recesses, the assembly further comprising a plurality of second side pieces of cladding metal engaging the cladding sheets so as to space the fuel units from one another, and a plurality of filler plates of an acid-dissolvable nonresilient material whose melting point is above 2000° F., each filler plate being arranged between a pair of said second side pieces and the cladding plates of two adjacent fuel units, the filler plates having the same thickness as the second side pieces; the method further comprising enclosing the entire assembly in an envelope; evacuating the interior of the entire assembly through said envelope; applying inert gas under a pressure of about 10,000 psi to the outside of said envelope while at the same time heating the assembly to a temperature above the flow point of the cladding metal but below the melting point of any material of the assembly, whereby the envelope is pressed against the assembly and integral bonds are formed between plates, sheets, first side pieces, and end pieces and between the sheets and the second side pieces; slowly cooling the assembly to room temperature; removing the envelope; and dissolving the filler plates without attacking the cladding metal.

2. The process of claim 1 wherein each core plate is coated with a barrier material before being enclosed in the sheets and pieces of cladding metal to prevent chemical interaction between the core material and cladding metal.

3. The process of claim 2 wherein the core plates contain uranium oxide, said barrier material is graphite and said cladding metal is zirconium, and said assembly is heated to a temperature of between 1500° to 1600° F. for between 2 to 6 hours while maintaining the inert gas pressure at approximately the aforesaid pressure of 10,000 psi.

4. The process of claim 2 wherein the core plates contain metal hydride, the barrier material is molybdenum, the cladding metal is stainless steel, and said assembly is heated first to a temperature of approximately 1650° F. for about 4 hours while maintaining the inert gas pressure at about the said pressure of 10,000 psi and then to a temperature of 1950° for approximately one hour at the same pressure.

* * * * *